(12) United States Patent
Albers et al.

(10) Patent No.: US 8,306,784 B2
(45) Date of Patent: Nov. 6, 2012

(54) REAL-TIME ANALYSIS OF A COMPUTER SYSTEM

(75) Inventors: Karsten Albers, Weilheim (DE); Frank Bodmann, Oldenburg (DE); Frank Slomka, Braustein (DE)

(73) Assignee: Inchron GmbH, Potsdam (DE)

( * ) Notice: Subject to any disclaimer, the term of this patent is extended or adjusted under 35 U.S.C. 154(b) by 696 days.

(21) Appl. No.: 12/308,744

(22) PCT Filed: Jun. 28, 2007

(86) PCT No.: PCT/EP2007/005732
§ 371 (c)(1),
(2), (4) Date: Aug. 7, 2009

(87) PCT Pub. No.: WO2008/003427
PCT Pub. Date: Jan. 10, 2008

(65) Prior Publication Data
US 2010/0017168 A1    Jan. 21, 2010

(30) Foreign Application Priority Data
Jul. 3, 2006   (DE) .......................... 10 2006 031 013

(51) Int. Cl.
*G06F 11/30* (2006.01)
(52) U.S. Cl. ........................................ 702/186; 702/182
(58) Field of Classification Search .................. 702/182, 702/186; 707/899; 709/200, 220, 223, 227; 714/5, 38.1
See application file for complete search history.

(56) References Cited

U.S. PATENT DOCUMENTS 6,223,188 B1 *   4/2001   Albers et al. .................. 715/205
8,010,592 B2 *   8/2011   Albers .......................... 709/201

OTHER PUBLICATIONS

Harbour et al., 'Timing Analysis for Fixed Priority Scheduling of Hard Real-Time Systems', 1994, IEEE Transaction, pp. 1-27.*
"Hierarchical Event Streams and Event Dependency Graphs: A New Computational Model for Embedded Real-Time Systems" Karsten Albers, Frank Bodmann, Frank Slomka; Department of Computer Science, University of Oldenburg, IEEE Computer Society, Proceedings of the 18$^{th}$ Euromicro Conference on Real-Time Systems (ECRTS'06) 0-7695-2619-5/06 2006 IEEE.
"A general model for recurring real-time tasks" Sanjoy K. Baruah, The University of Vermont, 0-8186-9212-X/98 1998 IEEE.

(Continued)

*Primary Examiner* — Michael Nghiem
*Assistant Examiner* — Elias Desta
(74) *Attorney, Agent, or Firm* — Manabu Kanesaka

(57) ABSTRACT

A non-transitory computer readable medium for a real time analysis of a computer system performs a method of describing an occurrence pattern, for which a set of tasks is provided. The tasks are partially repeatedly requested by the system and processed or repeatedly generate events by requests to partial components of the system. An occurrence pattern of the events requesting the tasks or events generated by the task during the real-time analysis is represented by a description of event densities. The description includes a set of elements describing a portion of the occurrence pattern of the events. At least two elements for the description of the part of the occurrence pattern include a further set of elements providing a plurality of hierarchical levels. The further sets and thus the part of the occurrence pattern described by the further sets differ from each other.

16 Claims, 4 Drawing Sheets

OTHER PUBLICATIONS

First IEEE Symposium on Industrial Embedded Systems, Antribes Juan-Les-Pins, Oct. 2006; XP031086712; "Analyzing the Timing Characteristics of Task Activations" Frank Bodmann, Karsten Albers, Frank Slomka; Department of Computing Science-University of Oldenburg, 1-4244-0777-X/06 2006 IEEE.

8129 At Automatisierungstechnik, 43(Aug. 1995), No. 8, Munchen, DE; "Modelling time of event driven real-time systems for the schedulability analysis" Klaus Gresser, Dachau.

"An Event Model for Deadline Verification of Hard Real-Time Systems" Klaus Gresser; Lehrstuhl für Prozeβrechner, Prof. Dr. G. Färber; Technische Universität München, Franz-Joseph-Str. 38, W-8000 München 40, Germnay; 1068-3070/93 1993 IEEE.

"Compositional Scheduling Analysis Using Standard Event Models" Kai Richter; The SymTA/S Approach; Dissertation, 2005, Institute of Computer and Communication Network Engineering Department of Electrical Engineering and Information Technology Technical University Carolo-Wilhelmina of Braunschweig Braunschweig, Germny; XP-007903601.

"Behavior Modeling of Object-Oriented Distributed Systems" Jiannong Cao, Paul K.O Chow, Weijia Jia, Department of Computer Science, City University of Hong Kong, 83 Tat Chee Avenue, Hong Kong, 0-7803-3280-6/96, 1996 IEEE.

"Efficient Feasibility Analysis for Real-Time Systems with EDF scheduling" Karsten Albers, Frank Slomka, Department of Computer Scienece University of Oldenburg, Ammerländer Heerstraβe 114-118, 26111 Oldenburg, Germany; 1530-1591/05, 2005 IEEE.

N. Audsley et al., "Applying new scheduling theory to static priority pre-emptive scheduling", Software Engineering Journal Sep. 1993, pp. 284-292.

Klaus Gresser, Lehrstuhl Für Prozeβrechner "Echtzeitnachweis ereignisgesteuerter Realzeitsysteme", Apr. 1993, pp. 1-153.

Karsten Albers et al., "An Event Stream Driven Approximation for the Analysis of Real-Time Systems", Proceedings of the EUROMICRO Conference on Real-Time Systems, 2004, pp. 187-195.

Samarjit Shakraborty, "A New Task Model for Streaming Applications and its Schedulability Analysis".

* cited by examiner

REAL-TIME ANALYSIS OF A COMPUTER SYSTEM

BACKGROUND OF THE INVENTION

The invention relates to a real time analysis of a computer system.

The analysis of the time-based behavior of embedded real-time systems is needed in order to automate the development of such systems. Not only the correct but also the timely determination of the computation results is necessary for the correct function of real-time systems. Examples of such systems are airbag control or motor control.

A model of tasks communicating with each other as per FIG. 1 will be considered. In this connection, a "task" is a series of processing steps which processes a set of input values and, in doing so, generates computation results or changes to the system. A task can be represented by an algorithmic description or a description of one piece of hardware executing the functionality. In this connection, tasks can activate other tasks which, for example, further process the computation results of the activating task. Tasks can also access resources. The activations or resource accesses can take place at any point during the execution of the task. The activations of a task or the resource access will now be referred to as "event".

To be able to perform quick analyses for such a model, a description of the "occurrence behavior of events" is needed. "Occurrence behavior of events" is understood to mean the time-based occurrence behavior, in other words, the time intervals between a plurality of events. "Occurrence pattern" is understood to mean a description of the occurrence behavior. The "occurrence pattern" comprises a plurality of description elements. The description elements can be the same or different; they each represent a portion of the "occurrence behavior of the events." A possible description of an "occurrence pattern" is the so-called "event density." Aside from this, it is also possible to describe an "occurrence pattern", for example, as a period or a jitter.

With the description form of the "event density," the maximum/minimum number of events is specified in time intervals of a specified length. In this connection, the event density can be subject to fluctuations.

Moreover, the description should also support a quick analysis of the time-based behavior, in particular the guaranteed adherence to specified time limits. It is particularly important to quickly determine from a description of the "occurrence behavior of events" for specified intervals the number of events occurring in this and for specified numbers of events an interval in which this number can occur. In this connection, usually only the lengths of the intervals are significant and maximum or minimum interval lengths are needed for certain numbers of events, or maximum or minimum numbers of events are needed for certain interval lengths. In this connection, descriptions that permit this determination with a linear complexity regarding the number of elements of the description are particularly advantageous.

Many papers in this area use a purely periodic occurrence pattern.

From K. Gresser. *Echtzeitnachweis Ereignisgesteuerter Real-zeitsysteme*. Dissertation, VDI Verlag, Dusseldorf, (286), 1993, a description for occurrence patterns of events is known which is designated as an event stream model. In this connection, an "event stream" is described by a set of tuples, each consisting of a cycle z and a distance a. The tuples can be designated as "event stream elements". The distance to an origin specified the same for event stream elements is assumed. Each event stream element generates its own occurrence pattern, wherein the first event of the event stream element can occur at a distance a from the common origin and each of the subsequent events then follow displaced by the cycle z. Thus the second event can follow at the distance of a+z from the origin, the third event at a+2z and so forth. The total event stream results from a superposition of the occurrence patterns of all event stream elements. Furthermore, only those event streams are considered valid in the task that generate an occurrence pattern for which the greatest densities of events each begin at the origin. Hence, the initial distance zero must be assigned to at least one event stream element. In this connection, it is assumed that the event stream describes an upper limit for a "maximum occurrence pattern" of events. A "maximum occurrence pattern" is understood to mean an occurrence pattern which has a maximum possible event density. During the real sequence, a less dense occurrence of the events in a system than that described by the event stream is considered permissible. In this connection, permissible means that time limits whose adherence to can be guaranteed for the event stream, and can also be adhered to for the decreased event density. A real-time analysis method will be described for this model.

In later works (K. Albers, F. Slomka. *An Event Stream Driven Approximation for the Analysis of Real-Time Systems*. IEEE Proceedings of the 16th Euromicro Conference on Real-Time Systems, 2004, p, 187-195; K. Albers, F. Slomka. *Efficient Feasibility Analysis for Real-Time Systems with EDF-Scheduling*. Proceedings of the Design Automation and Test Conference in Europa (DATE'05) p. 492-497), a very efficient real-time analysis is described for this. The problem of this description is that event bursts cannot be efficiently represented and thus also not efficiently analyzed. An "event burst" is understood to mean a limited time increase in density of events within one "occurrence pattern." The event stream model requires that each event within an event burst must be represented by its own event stream element. Only when event bursts repeatedly occur periodically within an occurrence pattern is it sufficient to assign to the events of the first event burst an event stream element, respectively. Since event bursts can comprise thousands of elements, the event stream model is not suitable as a description form for such systems.

In S. Chakraborty, L. Thiele, *A New Task Model for Streaming Applications and its Schedulability Analysis*, IEEE Proceedings of the Design Automation and Test in Europe Conference (DATE'05), pp. 486-491, 2005, a possible description for occurrence patterns is presented which is specialized for an efficient representation of event bursts. The occurrence patterns are again described by a set of tuples. In this model, these consist of a number of events and an interval, and specify the maximum number of events which can occur in an interval of this length. In this connection, the individual tuples mutually restrict each other so that only occurrence patterns are permitted that satisfy all tuples. Certain event bursts can be described efficiently with this model. However, the problem with the description is that the suggested analysis requires a stipulation of many linear combinations of all tuples and thus cannot be performed efficiently. Furthermore, many kinds of event bursts cannot be efficiently represented by the model. An occurrence pattern for which, for example, the first two events occur at a distance t from each other and all other events occur at a distance 1>t from their respective previous event, cannot be represented efficiently by this model. Each event except the first would have to be described by its own tuple. Furthermore, such occurrence patterns in which event bursts with different internal occurrence patterns occur cannot be described.

In K. Richter, *Compositional Scheduling Analysis Using Standars Event Models*, dissertation, TU Braunschweig, 2005, a description is presented in which the events are described by a period, an event jitter and a minimum distance between events. In this connection, the "event jitter" describes a time interval in which the principal periodic occurrences can fluctuate. When the event jitter comprises a plurality of periods, all those events which occur within the time interval can occur almost simultaneously. They are only separated by the minimum distance.

This model can be used to describe a simple, initially occurring event burst with a simple minimum distance between the events within the event burst. More complex event bursts which, for example, can occur repeatedly, or event bursts with a more complex occurrence pattern of the events within the event burst cannot be represented with this description.

SUMMARY OF THE INVENTION

Object of the present invention is to remove the aforementioned disadvantages of the prior art.

This object is solved by the aspects 1, 13 and 20 of the present invention. Useful embodiments result from the aspects 2 to 12 and 14 to 19 of the present invention.

A method for the analysis, in particular real-time analysis, of a system, in particular a computer system, is suggested for which a set of different tasks ($\tau$) is provided, wherein the tasks ($\tau_n$) are at least partially repeatedly requested by the system and processed or repeatedly generate events by requests to partial components of the system, wherein an occurrence pattern of the events requesting the tasks or generated by the task during the analysis are represented at least partially by a description of event densities, which consists of a set of elements each of which describes a portion of the occurrence pattern of the events, wherein at least two elements for the description of the occurrence pattern represented by them comprise a further set of further elements, and the further sets and the occurrence pattern described by them differ from each other.

Furthermore, a method for the analysis, in particular for the real-time analysis, of a system, in particular a computer system, is suggested for which a set of different tasks ($\tau$) is provided, wherein the tasks ($\tau_n$) are at least partially repeatedly requested by the system and processed or repeatedly generate events by requests to partial components of the system, wherein at least one task, when activated, generates a plurality of events, wherein an inner behavior of the task is described by a control stream which is represented by a control flow graph, wherein a step is provided in which, from occurrence patterns of the events determined for a plurality of related partial graphs and/or nodes of the control flow graph, a further occurrence pattern is determined for the control flow graph and partially at least one additional occurrence pattern of events of the partial graphs which is used for this determination, and this additional occurrence pattern represents a possible occurrence pattern of events in time-based dependency on certain flow path points of the partial graphs.

These methods will now be described in more detail. In this connection, "resources" are understood to mean the means of working in a system which are only available in a limited manner or are allocated by quantity or time, such as, for example, memory, capacity on communication media such as buses, computing time on processors and application-specific switching logics.

In the sense of this invention, the term "occurrence pattern" is understood to mean a time-based occurrence pattern which describes the occurrence of events along a timeline.

In the sense of this invention, a "further control flow graph" can be a subset of the "control flow graph."

In the following, "costs" are understood to mean the types of costs required for the analysis such as computing time or power costs. Availability of these is also only limited for limited time intervals. An analysis which determines a minimum cost expenditure for certain results such as the maximum number of occurring events thus also simultaneously determines the minimum time requirement for this result.

BRIEF DESCRIPTION OF THE DRAWINGS

FIG. 2 is a task graph illustrating a step-by-step run through.

DETAILED DESCRIPTION OF PREFERRED EMBODIMENT

Figure 1:
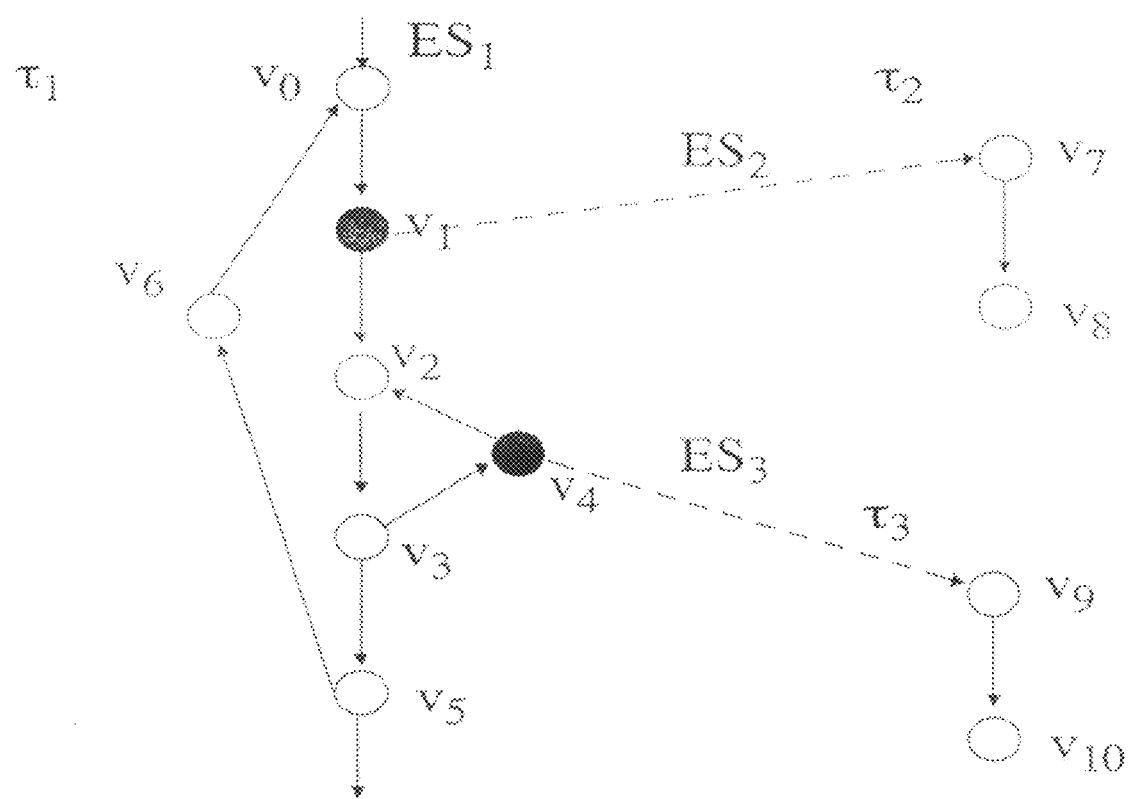
FIG. 1 is a diagram illustrating a model of tasks communicating with each other.

In the following, a first embodiment will be presented for the solution provided by the invention in accordance with aspect 1 and the embodiments in accordance with aspects 2 to 12:

The hierarchical event streams (HES).

An "event sequence" describes the "occurrence pattern" of events by their "event density." An "event sequence element" is a partial element of this description. An occurrence pattern of events is described by a "hierarchical event sequence $\Theta$." This consists of a set of hierarchical event sequence elements. A "hierarchical event sequence element $\omega$" is characterized by a period (or cycle) p, an initial starting distance a, a limit n and a recursive embedded hierarchical event sequence $\Theta'$ ($\omega=(p, a, n, \Theta')$). The limit n limits the maximum number of events which can be generated in a period of the embedded hierarchical event sequence $\Theta'$. To enable a recursion start, a hierarchical event sequence element $\omega$ can contain an embedded hierarchical event sequence or also only a simple event. In this case, only a limit with the value one is useful. The period can also be assigned with the value $\infty$ which represents a unique generation of the occurrence pattern.

A concrete hierarchical event sequence, for whose occurrence patterns of events the greatest densities of the events are always at the beginning, is designated as "hierarchical event stream." It enables efficient methods of real-time analysis. Insofar, for example, the real-time analysis methods presented in Karsten Albers, Frank Slomka, *An Event Stream driven Approximation for the Analysis of Real-Time System*, IEEE Proceedings of the 16th Euromicro Conference on Real-Time Systems 2004 (ECRTS'04), Catania, Italy, p. 187-195 can be applied accordingly.

In the first embodiment, a value of the limit is represented by a number of events. However, it is also conceivable to specify a maximum interval length as limit. In the first embodiment, up to that number of events in a period are generated by the hierarchical event sequence element as can be maximally generated by the recursive, embedded event sequence in an interval with the length of the limit.

The occurrence pattern of the events of a hierarchical event sequence is formed by a superposition of the occurrence pattern of the individual hierarchical event sequence elements. The first event in the occurrence pattern of a hierarchical event sequence element can follow after the initial distance a. The occurrence pattern of this and the following events is described by the occurrence pattern of the embedded hierarchical event sequence $\Theta'$ which, however, is displaced in comparison to the origin of the occurrence pattern by the initial distance a. In this connection, it only comprises the first n events of the embedded hierarchical event sequence $\Theta'$. These will now be designated as "event group" in the following. This embedded hierarchical event sequence $\Theta'$ is now repeated with the period p, thus beginning with a+p, a+2p, a+3p, and so on.

A hierarchical event sequence $\Theta$ itself can again be recursively embedded in a hierarchical event sequence. In this case, the above method must be used repeatedly.

To enable an efficient implementation of the analysis, it is advantageous to exclusively use hierarchical event streams $\Theta$ in which the event groups generated by the individual event stream elements are separated from each other, in other words they may not overlap (separation condition).

The following HES satisfies, for example, the separation condition: $\Theta_A = \{(100, 0, 7, \Theta_B), (100, 30, 5, \Theta_C)\}$. The hierarchical event streams $\Theta_B$ embedded recursively in $\Theta_A$ and QC are required: $\Theta_B = \{(3, 0, 1, e)$ and $\Theta_C = \{(7, 0, 1, e), (7, 3, 1, e)\}$. Seven events each can be generated pro period in the first element of this HES $\Theta_A$, and five events each in the second element of the HES $\Theta_A$. The distances between these events and thus the intervals during which the seven or five events can be generated, are determined by the respective recursively embedded event streams $\Theta_B$ and $\Theta_C$. In this manner, a further event can occur respectively for the first element of the HES in an interval which is three cost units greater. A maximum of two events can occur in an interval of the length three since the first event can occur at the time zero and the events have a period of three. A maximum of three events can occur in one interval of the length six, a maximum of four events can occur in one interval of the length nine, and a maximum of five events can occur in the length 12. Thus, for the total number of seven events per period, a minimum total interval of 18 cost units results in which these events can occur. For the second element, the occurrence is stipulated by the recursive embedded event stream $\Theta_C$. In this connection, for the first time two events can occur in one cost interval of the length three, three events in one cost interval of the length seven, four events in one cost interval of the length 10, and five events in one cost interval of the length 17. The total set of the number of events which can be generated in a period of the second element of $\Theta_A$ is limited to five which can thus be generated in one cost interval of the length 17.

Since an initial distance of 30 is allocated to the second element of $\Theta_A$, the events of the first period of this element are generated in an interval between the cost points 30 and 47. In case of the maximum occurrence pattern, the events of the first period of the first element of $\Theta_A$ are generated during an interval of the length of 18 cost units, starting with cost point zero. The intervals in which the events of the second period are generated are [100,118] or [130,147]. The intervals do not overlap which is the reason why $\Theta_A$ satisfies the separation condition. For a simple validation of the separation condition, it is advantageous when identical periods (homogeneous HES) are assigned to the individual elements of a hierarchical event stream. However, this is not absolutely necessary, in particular when, for the elements, the total number of events which can be generated by them is at least partially restricted.

The introduction of the separation condition enables a simple and efficient determination of a number of events occurring in an interval I starting at the origin of the occurrence pattern, in dependency on the length of the interval. For example, it can be determined with the following formula:

$$ESF(I, \Theta) = \begin{cases} 1 \text{ if } \Theta = e \\ \sum_{\omega \text{ in } \Theta} \left( \left\lfloor \frac{1 - a_\omega}{p_\omega} \right\rfloor n_\omega + \min(n_\omega, ESF(((I - a_\omega) \bmod p_\omega), \Theta_\omega)) \right) \text{ else} \end{cases}$$

The formula evaluates the individual event sequence elements separately, wherein, due to the separation condition, only the last period of each element is analyzed more precisely, and thus must be recursively evaluated. The limit as generated number of events may be taken respectively as the basis for the preceding periods. In the formula, mod represents the modulo operation which determines the remainder of the division.

The use of descriptions for which the separation condition is not always fulfilled is also conceivable. This creates more analysis work since a plurality of periods must be analyzed separately for the elements whose occurrence patterns can overlap.

The description form can also be used with slight adjustments to represent minimal numbers of events occurring in intervals.

The methods will now be described in more detail in accordance with the aspects 13 to 19.

It enables a precise stipulation of the set of events outgoing from a task, separately for each permissible interval length. The method enables a determination of the time-based density of the events outgoing from the task from the activations arriving at the task and the description of the control stream of the task. In this connection, "outgoing events" can be activations of other tasks, accesses to resources such as memory and buses, or other impacts on the system, parts thereof or the environment. Activations and events can be preferably described with the help of the hierarchical event sequence model. A method is suggested for the stipulation of the hierarchical event sequences outgoing from the internal control stream of a task and the hierarchical event sequence arriving at this task. In this connection, the hierarchical event sequence describes the possible time-based densities of the events. With the method provided by the invention, the information is abstracted via the time-based relationships from the internal control stream of the task. This makes it possible to stipulate the cases of maximum occurrence patterns over all execution paths within the task.

A possible design form of the methodology and the event-dependency analysis will now be described in detail.

In this connection, a task is modeled by a control flow graph which can contain both branches and loops. In this connection, the individual nodes of the control flow graph can represent basic blocks. A "basic block" is a sequence of consecutive instructions and is characterized in that the branches and the generation of events can only take place at the end of the basic block. Events are generated at certain, marked basic blocks. Essential for the advantageousness of the analysis provided by the invention is the existence of tasks which generate a plurality of events during one run. It is particularly advantageous when these events cause the activations of the same task or are located somewhere else in competition with each other for the same resource. The goal is the efficient determination of the possible time-based behavior of these events with each other from the control flow graph of the task.

In this connection, the analysis consists of the following steps:

A step-by-step run through the control flow graph of the task takes place. With each step, an update is performed of the event sequence (or sequences) outgoing from the already run through partial graph of the task and of the additional, to be described in more detail, event sequences. Operations are described for this with which a outgoing event sequence of a control flow graph from the outgoing event sequences of partial graphs from which the control flow graph is composed can be obtained. Also specified are the event sequences for simple partial graphs comprising a single node. With this information and the operations it is then possible to calculate the outgoing event sequences for any control flow graphs.

If the control stream contains branches, these are run through separately. Within one branch, the outgoing event sequences and event sequences for the individual branches are described separately. The individual descriptions are united with each other when the different branches converge. The details of this method will now be described in more detail.

First, the analysis is described for tasks whose control stream does not contain loops.

Figure 2:
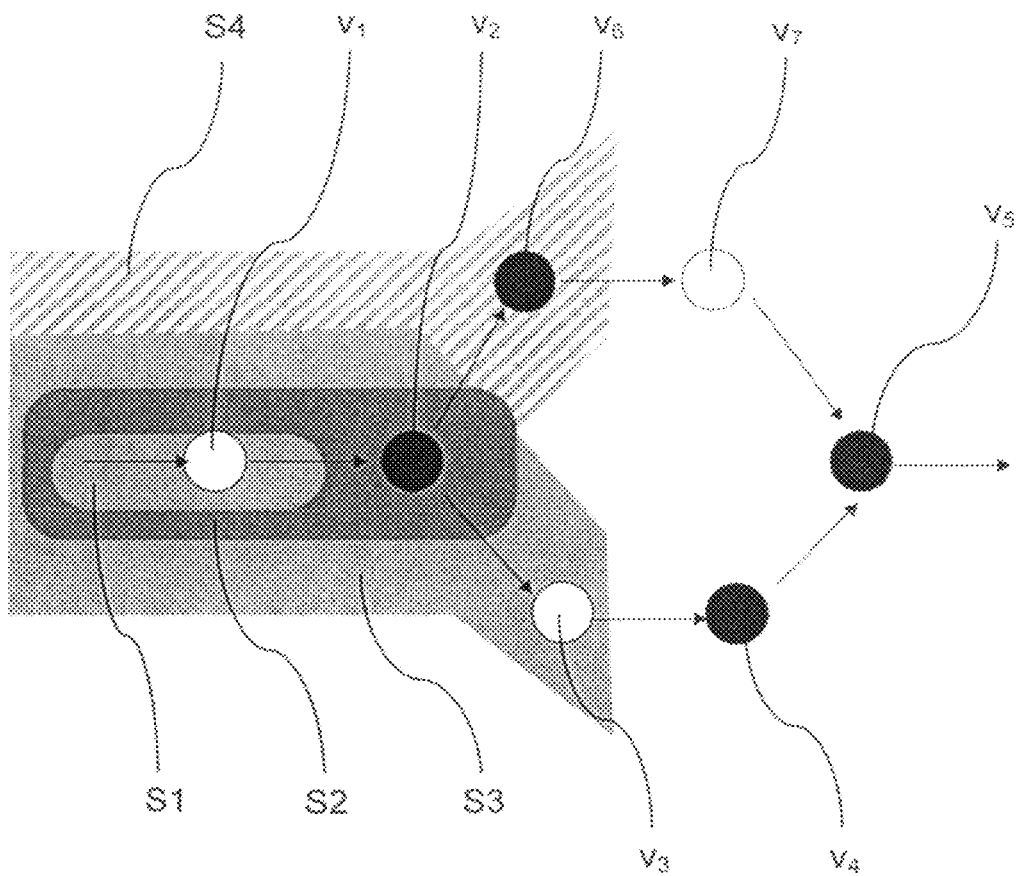

FIG. 2 illustrates a step-by-step run through a task graph. Here the control flow graph represents the control data stream of a task. It consists of the basic blocks of the task and their activation or communication relationships. A basic block contains an execution section and is distinguished thereby that it can only be activated as a whole and branches and activations of other basic blocks or tasks only follow at the end of the basic block. Thus the concrete execution of a task results from running through the control flow graph along the activation relationships of the individual basic blocks. Running through begins at a start node $v_1$ of the task. This is activated by the events arriving at the task. With each step of the run, a successor node $v_2$-$v_7$ is considered by an already analyzed node. With branches, the different branches are processed separately. Nodes which have a plurality of predecessor nodes are not processed until all predecessor nodes have been processed. Thus the control flow graph is reconstructed step-by-step during the run. During each step S1-S3 of the run, a further node is added to the already analyzed partial graph. This reconstruction need not be executed during the method. It only calculates the processing sequence of the nodes. In each processing step S1-S3, the resulting event stream is stipulated from the previous partial graph. The information for the node itself such as execution costs, for example, in the form of computing time, the information whether an event is generated, and the event streams determined for the predecessor nodes are used. Information on the other nodes or structure information on the partial graphs run through up to now are no longer relevant. Methods are needed as basic operations for this step-by-step processing to 1. add a node to an existing partial graph (concatenation operation) or
2. reunite two (or more) partial branches of the partial graph (unification operation).

In these cases, calculation methods are now needed to generate the appropriate information from the information available for the predecessor partial graphs for the partial graphs to be created. Here "information" is understood to mean the maximum and minimum event streams resulting from the partial graph and the event sequences needed for their calculation.

In particular, the event sequences are the start event sequence, the end event sequence, the inner event sequence and the total event sequence. Not all event sequences are always needed. They are defined by the result of their event sequence analysis. The "start event sequence" describes for every possible number of events the costs which are needed to generate the number of events in question from the partial graph when starting at the activation of the first node of the partial graph.

In reverse the "end event sequence" describes looking back on the completion of the end node of the partial graph what costs were last needed so that a certain number of events could be generated.

The "inner event sequence" is used to stipulate the minimum cost for every possible number of events whose cost was needed for any run through the partial graph to generate this number of events. It corresponds to the resulting event stream of the partial graph.

The "total event sequence" describes for every possible number of events the minimum cost for any run through the partial graph from the activation of the start node to the completion of the end node. In this connection, only the monotone increasing costs must be considered for an increasing number of events. If the cost of the generation of four events, for example, is lower than for the generation of three events, the cost of four events is also assumed for the generation of the three events.

The sequences can, for example, be efficiently described in the form of an event sequence, advantageously of a hierarchical event sequence (HES). In this connection, it is preferable that, for the total event sequence (TS), the cost of a potential path s through the partial graph for which no events are generated, will be noted in addition to the event sequence (TS=(a, Θ)).

The total event sequence plays an important role during the consideration of loop constructions. In this connection, every possible number between the maximum and the minimum number of loop runs is considered and not just a maximum possible number of possible loop runs.

The smallest possible unit which must be considered for the run through the control flow graph is a single node. Each node of the control flow graph can itself also be considered a graph. The node can be characterized by an initial start, end, inner and total event sequence. In this connection, two different possible starting sets of event sequences exist depending on whether a node generates an event or not. The initial event sequences for a node which generates an event are listed as follows: StS={(∞, k, 1, e)}, ES={(∞, 0, 1, e)}, IS={(∞, 0, 1, e)} and TS=(k, (∞, k, 1, e)).

In this connection, StS represents the start event sequence, ES the end event sequence, IS the inner event sequence and TS the total event sequence. The value of k is the cost of the node. To stipulate the maximum event density, the minimum execution costs of the node are needed here. In this connection, TS is described as tuple from the minimum passage costs even without event generation and the event sequence.

The following initial event sequences result for one node which does not generate an event: StS={ }, ES={ }, IS={ } and TS=(k, { }). It must still be noted that, without violating the general applicability, the generation of the events only occurs at the end of a node.

To set up step-by-step the event sequences for complex graphs from these event sequences, methods are needed for the unification of partial graphs (unification operators) and for concatenation of a node to a partial graph (concatenation operators).

It will now be presented how the event stream outgoing from a control flow graph can be stipulated exclusively with the above listed event sequences and the two methods.

First, the case is considered in which the task is only activated by an event. Since every node can be considered a partial graph, each step of the job is the unification of two partial graphs into one new one which contains both partial graphs. The problem is thus reduced to the problem of how the event sequences of the resulting partial graph can be calculated from the event sequences of the partial graphs.

The individual partial graphs can contain different paths through the control flow graph in which the same number of events occurs. The unification of the partial graphs can lead to further additional paths. These additional paths can lead to different costs. The event sequences of the united partial graph must cover the minimum or maximum costs of the partial graphs and the additional paths resulting from the unification.

With the concatenation or chaining of two partial graphs A and B, the event sequences of the resulting partial graph C is stipulated as follows. The start event sequence of C results from a unification of the start event sequence of A with a concatenation of the total event sequence of A with the start event sequence of B.

The end event sequence of C is stipulated by a unification of the end event sequence of B with the concatenation of the end event sequence of A and the total event sequence of B.

The inner event sequence results from the step-by-step unification of three event sequences. These are, on the one hand, the inner event sequences of the partial graphs A and B, and, on the other hand, an event sequence which results from the concatenation of the end event sequence of A with the start event sequence of B.

The total event sequence of C is only a concatenation of the total event sequences of A and B.

With the unification of partial graphs, there is only a unification of the individual event sequences of the one partial graph with the respectively corresponding event sequence of the other partial graph. Thus, all start, end, total and inner event sequences are each unified with each other. The resulting inner event sequence of the total graph corresponds to the resulting event sequence of the total graph.

For an efficient implementation of the operations, it is advantageous when the hierarchical event sequences at least satisfy the separation condition to a large extent.

A possible, concrete and efficient embodiment for the unification operation of two or more (hierarchical) event sequences will now be described in more detail. It will be explained based on the hierarchical event streams, but can also be applied in simplified form to the simple event streams. Furthermore, only the event sequences for maximum event density will be considered and the explanations assume that all events also occur corresponding to this maximum occurrence pattern. However, this is not a restriction. In the real system, events can also occur with less time-based density if the maximum or minimum density of events specified by the event sequence is not exceeded or passed below. The resulting unified event sequence contains for all cost intervals the respective maximum number of events, which can be generated, of the event sequences arriving in the unification operation. The execution of the operation for the best possible event sequences is similar. In case the arriving event sequences fulfill the event stream property, the resulting event sequence from this embodiment of the unification operation also fulfills the event stream property. Thus the unification operation is given this property.

The unification of two event sequences is carried out in the suggested embodiment by a step-by-step stipulation of the respective event sequence dominating in partial areas. An event sequence dominates another event sequence when it can generate more events during the same interval. If it can generate the same number of events, one of the two event sequences can be considered as the dominating one. The complete range of possible numbers of events which can be generated is divided into individual partial areas in which one single arriving event sequence dominates completely. These individual areas will now be called "dominating sections." The appropriate element from the dominating, arriving event sequence can now be transferred to the resulting event sequence for each dominating section. In this connection, the parameters, in particular the initial distance and the maximum number of events that can be generated, must be advantageously adjusted so that the events generated from these elements can only occur within the domination section.

Figure 3:
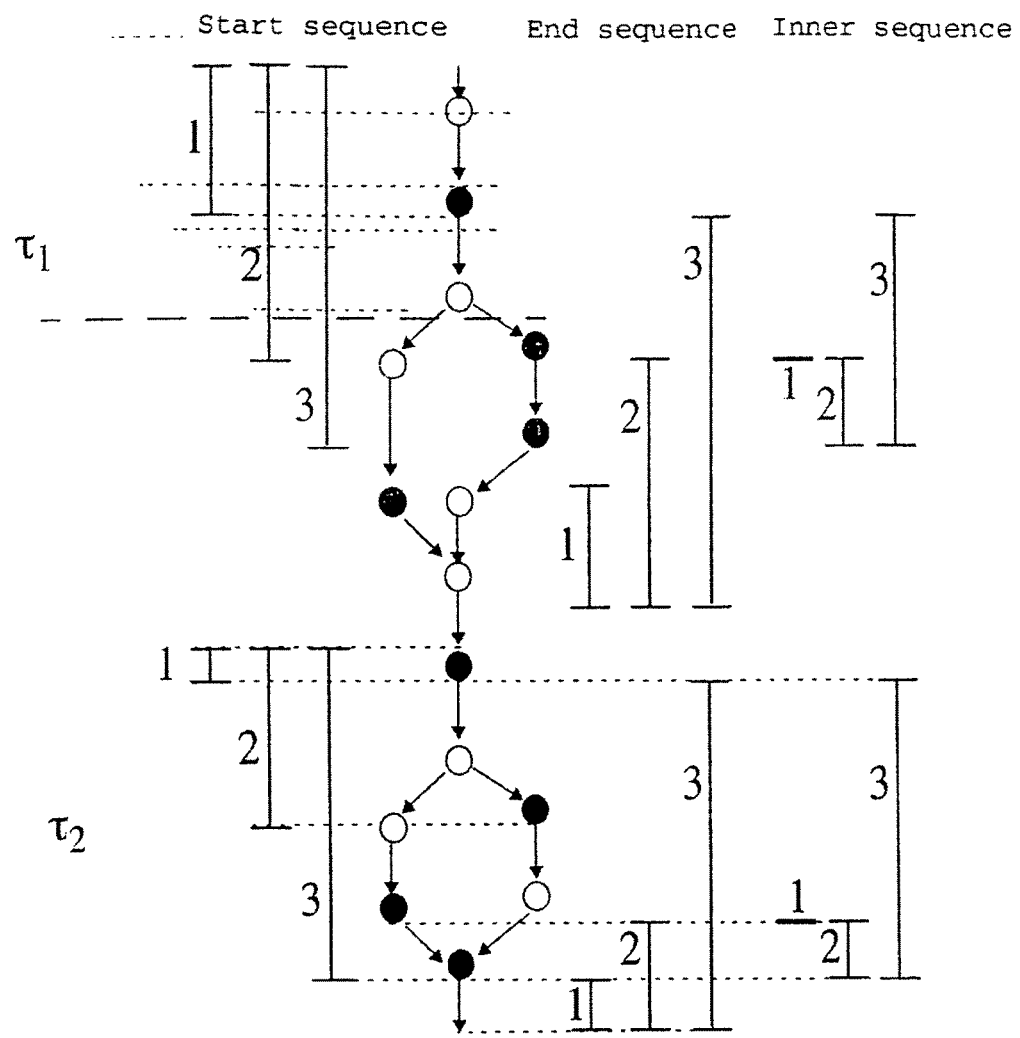
FIG. 3 is a diagram illustrating the process for the efficient calculation of the domination sequence.

FIG. 3 illustrates the process for the efficient calculation of the domination sequence. First, for the purpose of simple presentation, only the individual, simple event sequence elements are considered. These are each identified by a period and an initial distance. The function which specifies the minimum (maximum) interval for an element in which a certain number of events occurs (=event function), can be described by a linear equation. The starting value of the line is the initial distance and the slope is specified by the period. A comparison of two different event sequence elements of different event sequences is thus reduced to the incremental minimum creation of two lines. In this connection, there are two possible cases. Either the lines intersect or they do not. If they do not intersect, one line creates the minimum over the entire possible number of events and thus the event sequence element stipulating this line dominates the other element in all possible numbers of events. In this case, the resulting event sequence is only created from this dominating element.

If the lines do intersect, the domination changes at this intersection. The resulting event sequence is then created from at least two elements. These result from the elements dominating in the partial sections which are adjusted to the individual domination sections by an adjustment of the initial distance and the maximum number of events which can be generated in one period. The first element is provided with a limit as to the maximum number of events which it can generate so that only events are generated up to the intersection. The second element is provided with an initial distance which only permits a generation of events at or beyond the intersection. The limit of the second element is adjusted in such a manner that the total number of events which can be generated is not exceeded. Due to this, the separation condition is also preserved in the resulting event sequence. An intersection is created when one element has a smaller initial distance but a larger period than the other element. When event sequences consist of more than one element, appropriate separate lines result respectively for the separation areas resulting from the individual elements. This can cause the domination to change a plurality of times. In the suggested embodiment of the operation, a separate event sequence element is inserted in the resulting event sequence for each domination section. However, some of these can then be combined again with exact or approximation compression methods. For example, when adjacent elements have the same period, these can be combined into one element with this period. All such event sequence elements in the individual sections are always compared with each other which can lead respectively to the same number of events. When event sequence elements are repeated periodically, this can cause a continuously repeated change in domination. For example, the following simple event sequences are indicated: $\Theta_1=\{(\infty, 0, 200, e)\}$, $\Theta_2=\{(\infty, 0, 100, e)\}$, $\Theta_3=\{(25, 0, 1, e), (25, 1, 1, e)\}$ and $\Theta_4=\{(12, 0, 1, e)\}$.

In this example, starting with the third event up to the domination limit, the domination changes continuously between an element of $\Theta_3$ and an element of $\Theta_4$. To be able to find clear dominations, such elements which lead to the same numbers of events are now compared with each other. In addition, the affected elements of the affected event sequences are adjusted to each other. This can be done, for example, by taking the number of elements in all event sequences and giving them the smallest common multiple of the number of elements of the individual event sequences. The number of elements of an event sequence is increased by increasing the period (doubled, for example) and the missing events for the compensation are generated by additional elements. With $\Theta_4$, for example, the number of elements is increased to two by doubling the period to 24 and inserting an additional element with (24, 12, 1, e). The events for this event sequence are then generated alternately by the two elements and no longer by one element. When the numbers of the affected elements of the different event sequences are given a common denominator, the respective corresponding elements which lead to the same numbers of events can then be directly compared with one another. The periods of the individual event sequence elements are not involved here. For example, in the above example, the respective first elements stipulate the intervals for the odd numbers of events 1, 3, 5, 7, . . . and the second elements the intervals for the even numbers of events 2, 4, 6, . . . . This applies at least after the adjustment of the number of elements and any sorting of the element by rising initial distance. The domination intervals can now be stipulated for each of these elements separately and the appropriate event sequence elements can be inserted in the resulting event sequence. With more complex event sequences with a plurality of recursion levels, for example, it is suggested that each of these be expanded to an identical structure and then united step-by-step with one another via the domination rules. The previously listed example event sequences $\Theta_3$ and $\Theta_4$ look like this after the expansion: $\Theta_3=\{(25, 0, 1, e), (25, 1, 1, e)\}$ and $\Theta_4=\{(24, 0, 1, e), (24, 12, 1, e)\}$. FIG. 5 shows the domination graphs for these two event sequences. The resulting event sequence can be written as follows:

$\Theta_r=\{(\infty, 0, 50, \{(24, 0, 1, e)\}), (\infty, 0, 11, \{(25, 0, 1, e)\}), (\infty, 264, 39, \{(24, 12, 1, e)\}), (\infty, 1188, 50, \Theta_3)\}$.

After simplification, the resulting event stream has the following description: $\Theta_r=\{(\infty, 0, 22, \{(24, 0, 1, e), (25, 1, 1, e)\}), (\infty, 264, 78, \{(12, 0, 1, e)\}), (\infty, 1188, 100, \Theta_3)\}$ It can happen that a line section breaks off due to the limit of the total number of events. In this case, one of the remaining lines dominates afterwards. In the example, this is the case for all numbers of events starting at 100 events. In the section of the first 100 events, the first element of $\Theta_3$ dominates for the odd numbers of events and the second element of $\Theta_4$ for the even numbers of events. After 11 events, the domination changes there to the second element of $\Theta_3$. After 100 events, only the elements of $\Theta_3$ still dominate.

An exemplary embodiment will now be presented for the concatenation operation. It is mainly needed to stipulate the inner event sequence. With the embodiment for the unification operation, the elements of the involved event sequences are compared with one another separately from one another. With the concatenation, the elements of one event sequence are supplemented by elements of the respective other event sequence. This leads to more combination possibilities for the individual numbers of events. Many numbers of events can be generated by each element of the involved event sequences when the respective other event sequence is supplemented appropriately with a corresponding element.

With the concatenation operator, the resulting event sequence only contains intervals which, as per definition, always contain the intersection between the event sequences in possible event intervals. The different combinations of the elements lead to different minimum numbers of events. For each combination there exists an initial distance which results from the sum of the initial distances of the two involved elements. The combinations can be periodically continued in a maximum of two directions. Corresponding to the unification operation, only the combinations are compared with one another which also lead to the same numbers of events during their continuation. Possible domination sections result again from this. The combinations are compared with one another in two dimensions, namely their initial distance and their periods. If a combination can be periodically continued in both directions, it is included twice in this comparison. If a plurality of combinations are identical in both values, any one of them can be selected. Such combinations both of whose criteria are at the most equally good or worse than other combinations are not relevant to the resulting event sequence. In this connection, a combination with a shorter initial distance is better than a combination with a longer one, and a combination with a shorter period is better than a combination with a longer one. Each combination is continued with that event sequence element which has the shorter period since the initial distances within a combination are always the same. For the remaining combinations, the domination sections and intersections are calculated again, as with the unification operation, via the linear equations and from these the resulting event sequence elements are then stipulated with their initial distances and their limit. A distinctive feature of the concatenation operation is that when a limit of the number of events is reached for an event sequence element, the combination can be continued with the corresponding event sequence element until its limit has also been reached. In contrast, intermediate combinations for which only part of the maximum possible events of the two event sequence elements are included, are not relevant. When, for example, an event sequence can generate a maximum of five events and the event sequence combined with it can generate a maximum of eight events, for the numbers of events 2, 3, 4, 5, 6, only combinations of the two event sequences are considered for which one of the two sequences only generates one event. All other combinations, one combination for example, for which one event sequence generates two events and one event sequence generates three events (intermediate combination), lead to the same or greater size intervals and are thus not relevant to the creation of the case of the maximum occurrence pattern.

Figure 4:
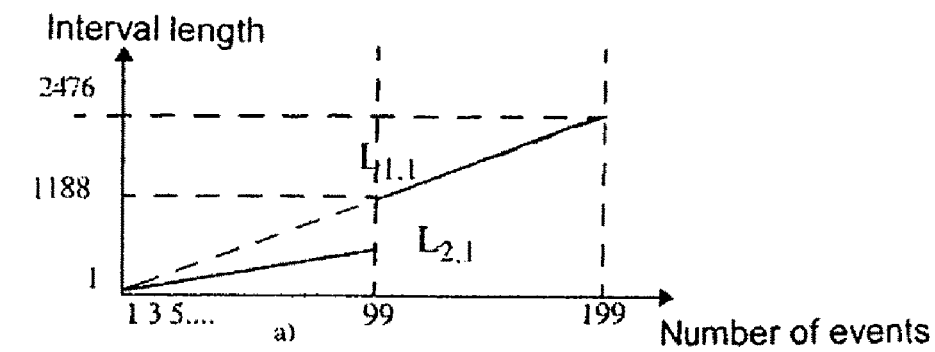
FIG. 4 is a graph illustrating an example of an operation using the following values: $\Theta_1=\{(\infty 0, 200, \{(25, 0, 1, e), (25, 1, 1, e)\})$ and $\Theta_2=\{(\infty, 0, 100, \{(24, 7, 1, e), (24, 19, 1, e)\})$.
Figure 4:
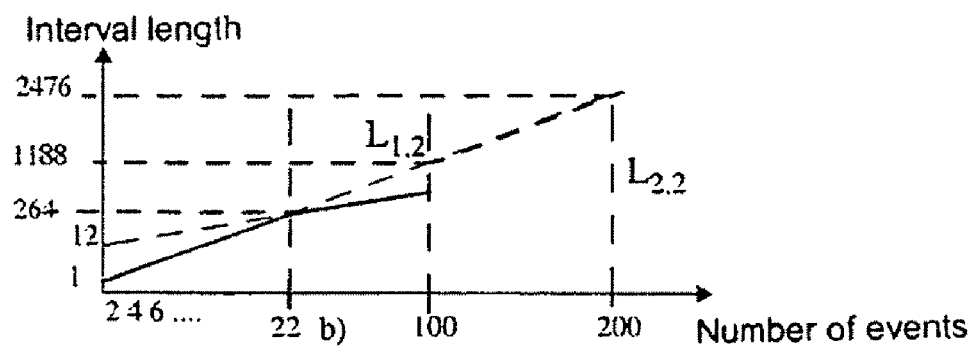

The continuation only in the direction of the shortest period leads to shorter intervals for the same number of events since the same initial distance is used. The operation will now be discussed based on an example which is also presented in FIG. 4:

$\Theta_1=\{(\infty, 0, 200, \{(25, 0, 1, e), (25, 1, 1, e)\})$ and $\Theta_2=\{(\infty, 0, 100, \{(24, 7, 1, e), (24, 19, 1, e)\})$.

$\Theta_1$ is an end event sequence and $\Theta_2$ is a start event sequence. Let $\omega_{1,1}$ be the first event sequence element of $\Theta_1$, $\omega_{1,2}$ be the second event sequence element of $\Theta_1$, $\omega_{2,1}$ be the first event sequence element of $\Theta_2$, and $\omega_{2,2}$ be the second event sequence of $\Theta_2$. With the concatenation of the two event sequences, an initial distance for two events results which distance is calculated by the sum of the initial distances of the event sequences. For each of the involved event sequences, this is the shortest initial distance of all their event sequence elements. In this example, this is seven, resulting from the event sequence elements $\omega_{1,1}$ with initial distance zero and $\omega_{2,1}$ with initial distance seven. If the event sequence elements are sorted, the respective first elements always result in this distance of two events.

This result leads to the event sequence elements $(\infty, 0, 1, e)$ and $(\infty, 7, 1, e)$ as the non-periodic starting portion of the resulting concatenated event sequence. The number of 3, 5, 7, 9 . . . events can be generated either by a combination of the event sequence elements $\omega_{1,2}$ and $\omega_{2,1}$ or by a combination of the elements $\omega_{1,1}$ und $\omega_{2,2}$. Since both combinations can be periodically continued by each of the two respectively involved event sequence elements, a total of four possibilities 3, 5, 7, 9, . . . events to be generated results. These possibilities are compared with one another via the parameters initial distance and period and the dominating combinations are thus determined. In the case here, this is the combination from the event sequence elements $\omega_{1,2}$ und $\omega_{2,1}$, which is periodically continued by the element $\omega_{2,1}$. Not until its limit is reached is the combination continued by the other element until its limit is also reached. The numbers of events 4, 6, 8, 10, . . . are either reached by a combination of the event sequence elements $\omega_{1,2}$ und $\omega_{2,2}$, or by a combination of the elements $\omega_{1,1}$ und $\omega_{2,1}$. With the second combination, a period is included in the initial distance of the combination in order to find the appropriate number of events. Due to this inclusion of a period, the appropriate limit must be reduced by one for the further analysis. Hence the following possible combination elements (without limit) result: (25, 20, 1, e), (24, 20, 1, e), (25, 25, 1, e) and (24, 24, 1, e). The second combination dominates at first. The same period 24 results for the initial dominating elements which permits a combination of these elements into a hierarchical event sequence element. In principle, such a combination is also possible for different periods up to the positions on which one element "runs" the other one, thus the sequence in which the elements generate events changes. Thus the event sequence elements (24, 8, 1, e) and (24, 20, 1, e) result without consideration of the limit for the resulting event sequence. These can be combined into the equivalent element (12, 8, 1, e). Under inclusion of the limit and the then resulting possibility of the periodic continuation of the combinations by the respective other partial element and under consideration of its limit, the event sequence $\{(\infty, 0, 1, e), (\infty, 7, 1, e), (\infty, 8, 98, qA), (\infty, 1220, 200, \Theta_B)\}$ with the recursive, embedded event sequences $\Theta_A=\{(12, 0, 1, e)\}$ und $\Theta_B=\{(25, 0, 1, e), (25, 1, 1, e)\}$ result as the result. As can be seen in the example, the design form of the concatenation operation enables the efficient determination of a outgoing event sequence whose resulting description complexity is kept within limits and can thus be used for further efficient processing.

A possibility of handling loops is to roll them out and then analyze the resulting graph with the presented method. In this connection, it is possible to analyze the trunk of the loop in advance as partial graph and to reduce it to its event sequences. During the analysis these continue to be concatenated with one another, wherein a possible breakdown of the loop below the maximum number of iterations should also be considered. Due to the regular structure, the loop analysis can also be performed with less effort by using the presented methods by utilizing the regularity of the structure and the occurrence pattern of events.

The method was described for the stipulation of maximum event sequences. However, it can correspondingly also be used for the stipulation of minimum or average event sequences. When a task is activated by a plurality of events, this can, for example, be modeled on itself by a continued concatenation of the control flow graph of the task. In this connection, minimum separation distances and time limits can be included or an event sequence which is calling the task can be transformed into a loop construction.

These methods can be implemented with a computer program product and a computer.

REFERENCE DESIGNATION LIST $\tau_n$ Task system
$\tau$ Task
HES Hierarchical event sequence
$\Theta$ Hierarchical event sequence
$\Theta'$ Further hierarchical event sequence
$\tau'$ Further task
I Time interval
$\omega$ Hierarchical event sequence element
p Period
a Initial distance
n Limit
$\Theta'$ Recursive, embedded hierarchical event sequence
$\omega=(p, a, n, \Theta')$

The invention claimed is:

1. A non-transitory computer readable medium encoded with a program for a real time analysis of a computer system for performing a method comprising the steps of:
  requesting at least partially repeatedly a set of tasks differing from each other or repeatedly generating events wherein the events request the tasks or the events are generated by the task, and occurrence pattern of the events requesting the tasks or the events generated by the task during the real-time analysis is represented at least partially by event densities,
  wherein the event densities comprise a set of elements each describing a part of the occurrence pattern of the events,
  wherein the set of elements comprises at least two other elements for the part of the occurrence pattern and said at least two other elements comprising represented by the at least two elements comprise a further set of further elements providing a plurality of hierarchical levels, and wherein an inner behavior of the task is described by a control stream which is represented by a control flow graph,
  determining the occurrence patterns of the events determined for a plurality of related partial graphs or nodes of the control flow graph, and
  determining, from the occurrence patterns of the events, a further occurrence pattern for a further control flow graph comprising the partial graphs or nodes, wherein for the determination at least partially an additional occurrence pattern of events of the partial graphs is used, and wherein the additional occurrence pattern represents a possible occurrence pattern of the events in time-based dependency on certain flow path points of the partial graphs, wherein the occurrence pattern of the events requesting the tasks or the events generated by the task during the real-time analysis is represented at least partially by the event densities, wherein the event densities comprise a set of elements each describing a part of the occurrence pattern of the events, wherein the set of elements comprises at least two other elements for the part of the occurrence pattern and said at least two other elements comprising a further set of further elements providing the plurality of hierarchical levels, and wherein the further set and further sets and thus the part of the occurrence pattern thereof differ from each other.

2. A non-transitory computer readable medium as defined in claim 1, wherein the elements are at least partially differ by at least a distance and a limit.

3. A non-transitory computer readable medium as defined in claim 2, wherein the elements are partially marked by a period.

4. A non-transitory computer readable medium as defined in claim 3, wherein the limit specifies a maximum number of events occurring in the occurrence pattern within one period of the element.

5. A non-transitory computer readable medium as defined in claim 2, wherein the limit is described by a number of events.

6. A non-transitory computer readable medium as defined in claim 2, wherein the limit is described by an interval length.

7. A non-transitory computer readable medium as defined in claim 1, wherein at least one element is described by an initial distance, a limit and a period.

8. A non-transitory computer readable medium as defined in claim 1, wherein some elements represent a single event.

9. A non-transitory computer readable medium as defined in claim 1, wherein the parts of the occurrence pattern described by the individual elements do not overlap.

10. A non-transitory computer readable medium as defined in claim 1, wherein the parts of the occurrence pattern described by the individual elements do not overlap.

11. A non-transitory computer readable medium as defined in claim 1, wherein following formula is used to determine a number of events occurring during an interval I described by the set $\theta$ of elements:

$$ESF(I, \Theta) = \begin{cases} 1 \text{ if } \Theta = e \\ \sum_{\omega \text{ in } \Theta} \left( \left\lfloor \frac{1 - a_\omega}{p_\omega} \right\rfloor n_\omega + \min(n_\omega, ESF(((I - a_\omega) \bmod p_\omega), \Theta_\omega) \right) \text{ else,} \end{cases}$$

wherein
- $\omega$ is a hierarchical event sequence element,
- $\Theta$ is a hierarchical event sequence,
- $a_\omega$ is an initial distance between two hierarchical event sequence elements,
- $P_\omega$ is a period of a hierarchical event sequence element,
- $n_\omega$ is a limit of a hierarchical event sequence element,
- I is the time interval, and
- $\Theta_\omega$ is a hierarchical event sequence of $\omega$.

12. A non-transitory computer readable medium encoded with a program for a real-time analysis of a computer system for performing a method comprising the steps of:

at least partially repeatedly requesting a set of tasks differing from each other, or repeatedly generating events, wherein at least one task, during an activation of the task, generates a plurality of events, and wherein an inner behavior of the task is described by a control stream which is represented by a control flow graph, determining an occurrence patterns of the events determined for a plurality of related partial graphs or nodes of the control flow graph, and determining, from the occurrence patterns of the events, a further occurrence pattern for a further control flow graph comprising the partial graphs or nodes, wherein for the determination at least partially an additional occurrence pattern of events of the partial graphs is used, and wherein the additional occurrence pattern represents a possible occurrence pattern of the events in time-based dependency on certain flow path points of the partial graphs, wherein the occurrence pattern of the events requesting the tasks or the events generated by the task during the real-time analysis is represented at least partially by event densities, wherein the event densities comprise a set of elements each describing a part of the occurrence pattern of the events, wherein the set of elements comprises at least two other elements for the part of the occurrence pattern and said at least two other elements comprising a further set of further elements providing a plurality of hierarchical levels, and wherein the further set and occurrence pattern thereof differ from each other.

13. A non-transitory computer readable medium as defined in claim 12, in which one of additional occurrence patterns is obtained by running through an end node of the partial graph going backwards in time.

14. A non-transitory computer readable medium as defined in claim 12, in which one of additional occurrence patterns is obtained by running through a starting node of the partial graph.

15. A non-transitory computer readable medium as defined in claim 12, in which one of additional occurrence patterns represents for each possible interval length a maximum number of events generated within the partial graph during an interval of the length.

16. A non-transitory computer readable medium as defined in claim 12, in which one of additional occurrence patterns represents for each possible interval length a maximum number of events generated within the partial graph during an interval of the length and flow path points of a starting node and an end node are located within the interval.

* * * * *